United States Patent [19]
Candy et al.

[11] Patent Number: 5,950,143
[45] Date of Patent: Sep. 7, 1999

[54] MONITORING OF A SYSTEM

[75] Inventors: Richard Brodrick Charles Candy; Anthony Vincent Blake, both of Gauteng, South Africa

[73] Assignee: Eskom, Gauteng, South Africa

[21] Appl. No.: 08/865,366

[22] Filed: May 29, 1997

[51] Int. Cl.[6] .................................................. H04B 17/00
[52] U.S. Cl. .......................................................... 702/61
[58] Field of Search ................................................ 702/182

[56] References Cited

U.S. PATENT DOCUMENTS 5,463,775  10/1995  Dewitt et al. ...................... 395/184.01

Primary Examiner—Thomas R. Peeso
Attorney, Agent, or Firm—Rockey, Milnamow & Katz, Ltd.

[57] ABSTRACT

A method of monitoring a system includes providing a representative structure of the system which has a plurality of levels in a pyramidal form and selecting a part of the system which is at a level that is not a bottom most level of the pyramidal structure and which has a plurality of sections. A first section of the part of the system is chosen and the said part of the system and its sections are displayed in a graphical manner in a first panel of a display. The said first section is displayed in a second panel of the display, with a symbol in the first panel representing the said first section being shown in a differentiated manner to other graphical components representing the said part. The invention also extends to an arrangement for monitoring a system.

20 Claims, 4 Drawing Sheets

MONITORING OF A SYSTEM

BACKGROUND OF INVENTION

This invention relates to the monitoring of a system. More particularly, it relates to a method of and an arrangement for monitoring a system. The system may be any type and may, for example, be an electric utility, a ship or craft, a chemical plant, or an amusement park.

SUMMARY OF INVENTION

Such systems have supervisory control and data acquisition arrangements which monitor the amplitude, state or condition of various parameters of equipment and components thereof and display alarm conditions on a display, to be acted on by control staff.

In this specification, the amplitude, condition or state of a parameter will be referred to as the "value" of the parameter.

A parameter is regarded as "abnormal" if its value attains an amplitude greater than or less than a predetermined amount or if its condition or state changes in an undesired way. Correspondingly, a parameter is regarded as "normal" if it has an amplitude less than or greater than the said predetermined amount (as the case may be) or if its condition or state is acceptable.

According to the invention there is provided a method of monitoring a system, which includes providing a representative structure of the system which has a plurality of levels in a pyramidal form;

selecting a part of the system which is at a level that is not a bottom most level of the pyramidal structure and which has a plurality of sections;

choosing a first section of the part of the system;

displaying the said part of the system and its sections in a graphical manner in a first panel of a display and displaying the said first section in a second panel of the display, with a symbol in the first panel representing the said first section being shown in a differentiated manner to other graphical components representing the said part.

The first section, being at a lower level to that of the part, may be displayed in the second panel in greater detail than in the first panel.

The method may include choosing a section of the part of the system and displaying the first section in the second panel first, with the second section then being displayed in the second panel.

Symbols in the first panel representing the first and second sections may be shown in a manner which differentiates between them and from other graphical components representing the said part.

The method may further include determining the values of a number of parameters of devices forming the system;

deciding from the values when the parameters become abnormal and when they become normal;

grouping the parameters in a plurality of different categories; and displaying the presence of abnormal parameters in each category.

The method may also include summing the number of abnormal parameters in each category and upwardly summing the number of abnormal parameters of each category.

Further according to the invention there is provided an arrangement for monitoring a system which is structured in a representative manner to have a plurality of levels in a pyramidal form, which includes a display means for displaying in a graphical manner a selected part of the system, with the selected part of the system being selected from a level which is not the bottom most level, and a chosen first section of the part, the part being displayed in a first panel and the first section in a second panel, and with a symbol in the first panel representing the said first section being shown in a differentiated manner to other graphical components representing the said part.

The display means may display the first section, being at the lower level to that of the part, in the second panel in greater detail than in the first panel.

The display means may first display the first section in the second panel and then display a second section of the selected part in the second panel.

The display means may show symbols in the first panel representing the first and second sections in a manner which differentiates between them and from other graphical components representing the said part.

Conveniently, the display means shows the symbols in different colours to distinguish between the symbols representing the section being displayed in the second panel from the symbol representing a section previously displayed and from remaining components.

The display means may show the symbol representing the section previously displayed in a differentiated manner until a further section is chosen and displayed in the second panel or for a predetermined period of time. Thus, the display means may gradually diminish the manner in which the symbol is differentiated. For example, if different colours are used, the intensity thereof may decrease with time.

The display means may provide a third panel for displaying a level of the system.

A first bottom-most level of the pyramidal structure may comprise devices in the system, a second level may comprise objects of the system, each object being formed by a plurality of the devices; and the structure having a suitable number of higher levels depending on the nature of the system. For example, if the system is an electric utility, with a third level may comprise stations, each station comprising a plurality of objects, a fourth level may comprise regions, each region in turn comprising a plurality of stations, and a top-most level may comprise the network, which is constituted by the various regions.

Conveniently, the sections that are chosen may be stations so that the second panel will display a station and the first panel display a region, with the network being displayed in a third panel.

The arrangement as described above may also include a value determining means for determining the values of a number of parameters of devices forming the system;

a value deciding means for deciding when the values of the parameters become abnormal and when they become normal; and a grouping means for grouping the parameters in a plurality of different categories.

The display means may also display the presence of abnormal parameters in each category in a graphical manner.

The categories of parameters may be represented by icons.

The number of abnormal parameters in a category may be represented by a number in the appropriate icon. The various categories may be represented by icons of different colours.

The number of abnormal parameters in each category may be upwardly summed.

The arrangement may include one or more central processing units, so that the manner in which the parts and sections are displayed may be implemented by suitable software.

The arrangement may be interactive. Thus, the display may be responsive to a pointing device so that a user can pick a symbol in the first panel to choose the desired section which will then be displayed in the second panel.

The values of the abnormal parameters may also be displayed by the display means.

The invention is now described, by way of an example, with reference to the accompanying drawings, in which:

DETAILED DESCRIPTION OF THE DRAWINGS

Figure 1:
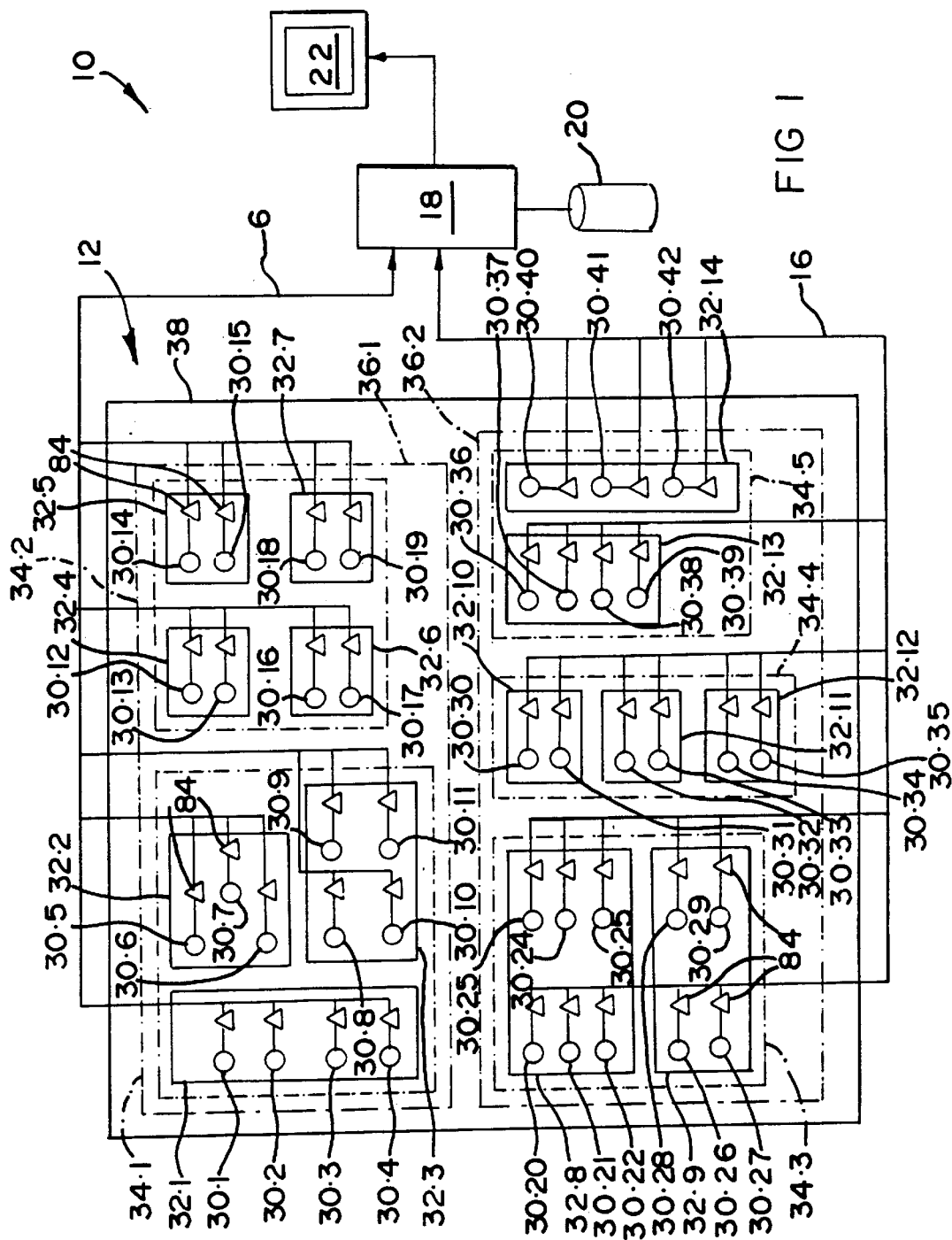
FIG. 1 shows schematically, an electric utility with a monitoring arrangement in accordance with the invention, for monitoring the operation thereof.

Referring to FIG. 1, a monitoring arrangement according to the invention is designated generally by reference numeral 10. The arrangement 10 monitors the operation of a system 12 which is an electric utility. The utility comprises a network 38 which is divided into regions 36.1 and 36.2. The region 36.1 has stations 34.1 and 34.2 and the region 36.2 has stations 34.3, 34.4 and 34.5. The station 34.1 has objects 32.1, 32.2, and 32.3; the station 34.2 has objects 32.4, 32.5, 32.6 and 32.7; the station 34.3 has objects 32.8 and 32.9; the station 34.4 has objects 32.10, 32.11 and 32.12; and the station 34.5 has objects 32.13 and 32.14. The object 32.1, in turn, is made up of devices 30.1, 30.2, 30.3 and 30.4; the object 32.2 is made up of devices 30.5, 30.6 and 30.7; the object 32.3 is made up of devices 30.8, 30.9, 30.10 and 30.11; the object 32.4 is made up of devices 30.12 and 30.13; the object 32.5 is made up of devices 30.14 and 30.15; the object 32.6 is made up of devices 30.15, 30.16 and 30.17; the object 32.7 is made up of devices 30.18 and 30.19; the object 32.8 is made up of devices 30.20, 30.21, 30.22, 30.23, 30.24 and 30.25; the object 32.9 is made up of devices 30.26, 30.27, 30.28 and 30.29; the object 32.10 is made up of devices 30.30 and 30.31; the object 32.11 is made up of devices 30.32 and 30.33; the object 32.12 is made up of devices 30.34 and 30.35; the object 32.13 is made up of devices 30.36, 30.37, 30.38 and 30.39; and the object 32.14 is made up of devices 30.40, 30.41 and 30.42.

Each device 30.1 to 30.42 is monitored by its own monitor 14, in a known manner. The monitors 14 monitor various parameters of the devices 30 and supply appropriate signals, again in known manner, via a transmission means 16, to a central computer 18. This computer 18 processes the signals that it receives and determines when any signal attains an abnormal value. If any parameter for any device 30 does acquire an abnormal value, the parameter, its value, the device and the time are stored in a memory unit 20 to create a database. Further, the various parameters are divided into different categories, being health, main protection, backup protection and information. The number of parameters in each category for each device that acquire an abnormal value are summed and also stored in the memory unit 20.

The various categories are upwardly summed, as explained below, for each category, for each object 32, each station 34, each region 36 and the network 38 as a whole; and stored in the memory unit 20. Still further, as explained below, the computer 18 generates and supplies appropriate signals to a display unit 22 which provides a display 60 such as that shown in FIG. 4.

In order to explain the pyramidal structure further, the grouping of an electric utility is explained as follows:

At the lowest level are the individual devices 30 that form the system, such as breakers, transformers and isolators.

When the devices 30 are grouped together they form the electrical objects 32 such as feeder bays, busbars, reactor bays, capacitor bays, transformer bays, etc.

Grouping the objects 32 together creates the substations or power generating stations 34.

Grouping the stations 34 together forms the region 36 of the network 38.

Grouping the regions 36 together forms the network 38.

In regard to the categories, as indicated above, they relate to the health of the devices 30, main protection, backup protection and information. Thus, any parameter which indicates that a condition exists on or associated with the device 30 that could prevent it being reinstated safely is classed in the health category. A parameter which is associated with primary protection and which indicates that primary protection has activated is classed in the main protection category. A parameter associated with secondary protection is classed in the backup protection category. Any other non-operation-critical information is classed in the information category.

The number of abnormal conditions may be upwardly summed.

Figure 2:
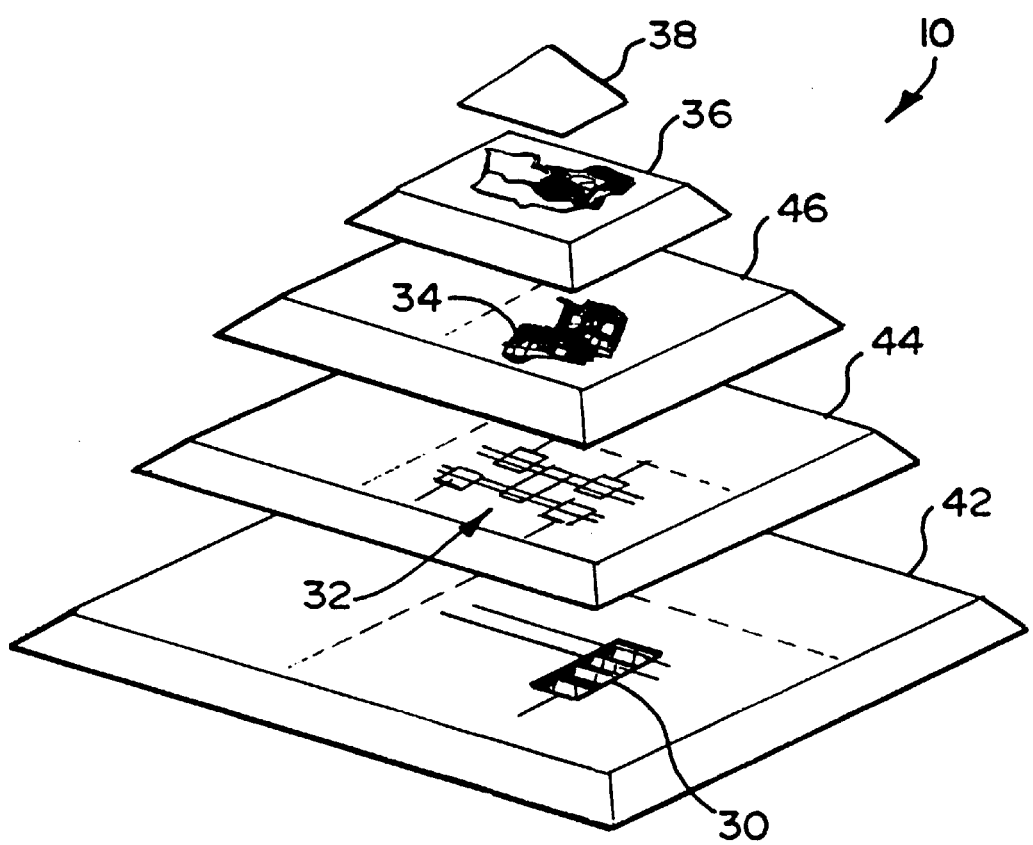
FIG. 2 shows schematically the pyramidal structure of the electric utility.

Referring now to FIG. 2, the pyramidal structure of the electric utility is shown. The structure denotes the utility in a notional representative form. It will be seen that the structure has five levels. A bottom-most, device level 42 represents the individual devices 30 which make up the electric utility. The second level 44 is representative of the electrical objects 32. The next level 46 represents the stations 34. Grouping the stations 34 together provides the regions 36. Finally, the upper-most level is the network 38.

As indicated above, various parameters associated with each device (and which vary from one device type to another) are monitored. Also, as indicated above, the parameters are divided into four categories—Health, Main protection, Backup protection and Information. Various parameters for various devices, and the category in which they are allocated are as follows:

1. GENERATOR

HEALTH CATEGORY

| | |
|---|---|
| General alarm | Alarm/normal |
| Emergency shutdown | Progress/inactive |
| Generator start | Not ready/idle |
| Synchronised start | Not ready/idle |

INFORMATION CATEGORY

| | |
|---|---|
| Emergency trip | |
| Remote control | On/off |
| Sequence start | Auto/remote |
| Shutdown | Yes/No |
| Status | Start/normal |
| Guide vane mode | Auto/manual |

2. TRANSFORMER

HEALTH

| | |
|---|---|
| SF6 non-urgent | Alarm/normal |
| SF6 urgent | Alarm/normal |
| Scald supervisory | Alarm/normal |

-continued

| | |
|---|---|
| DC supervisory | Alarm/normal |
| Fire | Alarm/normal |
| Bus zone DC | Fail/normal |
| MAIN | |
| Bus strip | Operated/normal |
| Bus zone | Operated/normal |
| Auto U/F control | Failed/normal |
| INFORMATION | |
| Maximum generation | Selected/off |
| Emergency generation | Selected/off |
| Maximum Generation | Reset/initiated |
| Emergency generation | Reset/initiated |
| 3. A DAM | |
| HEALTH | |
| Low water level | Trip/normal |
| BACKUP | |
| Supply dam #1 level | Trip/normal |
| Supply dam #2 level | Trip/normal |
| INFORMATION | |
| High water | Trip/normal |

The manner in which the parameters are monitored are well known to persons skilled in the control of electric utilities and do not form any part of this invention.

Figure 3:
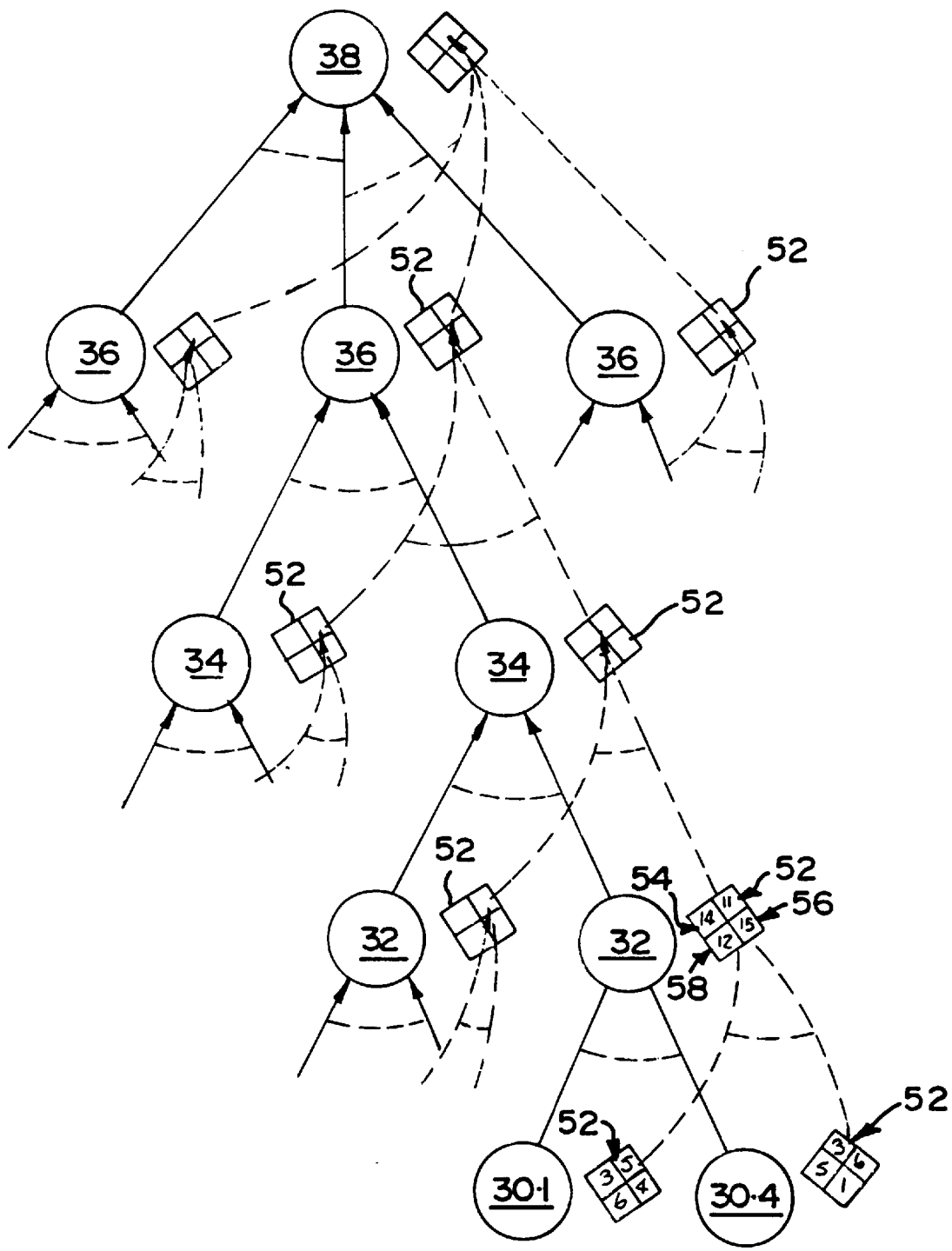
FIG. 3 shows schematically an upward summing procedure utilised with the structure.

The manner in which the parameters are upwardly summed is illustrated in FIG. 3 using "diamond-shaped" icons 52 to indicate each category. Thus, the parameters for all the devices 30 in the system are monitored and when any parameter attains an abnormal value the number for the category in question is increased by one. Similarly, if a particular parameter had an abnormal value which then reverted to a normal value, then the number in the category in question for the device in question is decreased by one.

As indicated above, there are a number of objects 32 in the object level. Each object 32 is made up of one or more of the devices 30. The number of abnormal parameters in each category for each device 30 associated with a particular object are summed to provide a number for the category in question for the object 32 in question. Thus, for example, if a particular object 32 is made up of four devices 30.1, 30.2, 30.3 and 30.4 and these devices have the following numbers of abnormal parameters in the four categories:

| | Number of abnormal parameters in health category | Number of abnormal parameters in main protection category | Number of abnormal parameters in backup protection category | Number of abnormal parameters in information category |
|---|---|---|---|---|
| Device 30.1 | 9 | 3 | 4 | 6 |
| Device 30.2 | 2 | 4 | 5 | 2 |
| Device 30.3 | 1 | 2 | 0 | 3 |
| Device 30.4 | 2 | 5 | 6 | 1 |
| Total for object 32 | 11 | 14 | 15 | 12 |

Thus, at the object level, the object 32 will have icons 52, 54, 56 and 58 for each category with the numbers "11", "14", "15" and "12" respectively, therein. As shown, the icons are diamond-shaped.

Similarly, at the station level there are a number of stations 34, each station being formed from one or more of the objects 32 in the object level. Again, the number of abnormal parameters in each category for each object 32 forming a particular station 34 are summed to provide the number of abnormal parameters in each category for that station.

This process is repeated further upwardly to provide the number of abnormal parameters in each category for each region 36 at the region level and then for the network 38 itself, at the very top of the pyramidal structure.

Figure 4:
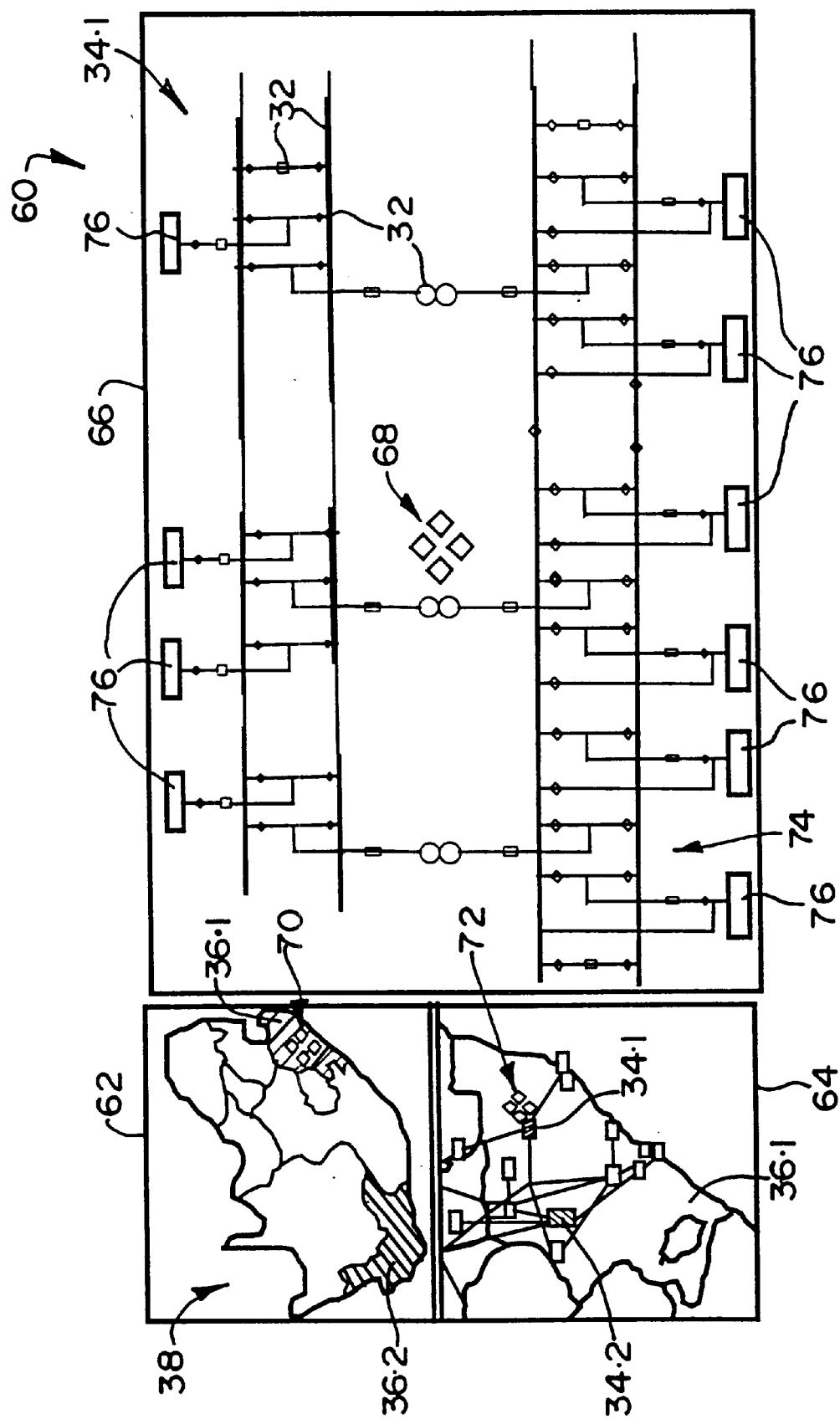
FIG. 4 shows a display that is provided by the arrangement.

Referring now to FIG. 4, an example of a display that is provided is designated generally by reference numeral 60. The display 60 has three panels 62, 64 and 66. The panel 62 displays the network 38 in a graphical manner, showing each region 36 geographically. The panel 64 displays a selected one of the regions 36 in more detail. In the example, the region 36.1 is displayed in panel 64. Because the region 36.1 has been selected, the geographic representation thereof in panel 62 is coloured red. Previously, another region 36.2 had been displayed in panel 64, so the geographic representation thereof in panel 62 is coloured orange.

It will be seen that the display in panel 64 of the region 36.1 shows a number of stations 34, by means of symbols, and the way in which they are interconnected. A particular station 34.1 has been chosen and this station is shown in more detail in panel 66. As is seen in panel 64, the symbol for station 34.1 is coloured red, as this is the station currently being displayed in panel 66. As another station 34.2 was previously displayed in panel 66, the symbol for this station 34.2 is coloured orange.

Referring further to panel 66, it will be seen that the objects 32 comprising the station 34.1 are graphically displayed. The status of the various objects 32 is indicated by the diamond shaped icons as at 68. The parameters are upwardly summed as explained above, so that icons also appear in the panels 62 and 64, as indicated at 70 and 72 respectively.

As discussed above, the orange colour of the region 36.2 in panel 62, and of the station 34.2 in panel 64 goes lighter over a predetermined period of time, which in the example, is 1 minute. Thus, after 1 minute, if there is no change, the region 36.2 and the station 34.2 will no longer be differentiated. It will also be appreciated that, if a new region is selected (either the region 36.2 or one of the other regions 36 other than region 36.1) then the new region will be displayed in panel 64 and panel 66 will be cleared until a new station 34 is chosen, when the new station 34 will be displayed in panel 66. The new region 36 in panel 62 will be coloured red and the region 36.1 will change to orange. The symbol in panel 64 for the station 34 that is chosen will also be coloured red until a further station 34 in that region 36 is chosen, when the symbol for the latest station will be shown as red and the symbol for the preceding station as orange.

Data is also displayed, as indicated at 74.

In use, the operator will choose what he wishes to display in the panels 64 and 66 by pointing at the appropriate region 36 in panel 62 and the appropriate station 34 in panel 64, respectively with the pointing device (not shown) and activating the pointing device. The computer 18 then provides the appropriate signals and the appropriate graphical representations are displayed in the panels 62, 64 and 66.

By means of the invention a control operator of the utility is assisted in navigating between the various sections of the network.

We claim:

1. An arrangement for monitoring a system which is structured in a representative manner to have a plurality of levels in a pyramidal form, wherein a first bottom-most level of the pyramidal structure comprises devices in the system, a second level comprises objects of the system, each object being formed by a plurality of the devices, and the structure has a suitable number of higher levels depending upon the nature of the system, which arrangement includes a display means for displaying in a graphical manner a selected part of the system, with the selected part of the system being selected from a level which is not the bottom-most level of the pyramidal structure and which has a plurality of sections, and a chosen first section of the part, the part being displayed in a first panel and the first section in a second panel, and with a symbol in the first panel representing the said first section being shown in a differentiated manner to other graphical components representing the said part.

2. The arrangement as claimed in claim 1 wherein the display means displays the first section, being at a lower level to that of the part, in the second panel in greater detail than in the first panel.

3. The arrangement as claimed in claim 2 wherein the display means first displays the first section in the second panel and then displays a second section of the selected part in the second panel.

4. The arrangement as claimed in claim 3 wherein the display means shows symbols in the first panel representing the first and second sections in a manner which differentiates between them and from other graphical components representing the said part.

5. The arrangement as claimed in claim 4 wherein the display means shows the symbols in different colours to distinguish between the symbol representing the section being displayed in the second panel from the symbol representing a section previously displayed and from remaining components.

6. The arrangement as claimed in claim 5 wherein the display means shows the symbol representing the section previously displayed in a differentiated manner until a further section is chosen and displayed in the second panel.

7. The arrangement as claimed in claim 6 wherein the display means gradually diminishes the manner in which the symbol is differentiated.

8. The arrangement as claimed in claim 5 wherein the display means shows the symbol representing the section previously displayed in a differentiated manner for a predetermined period of time.

9. The arrangement as claimed in claim 8 wherein the display means provides a third panel for displaying a level of the system.

10. The arrangement as claimed in claim 1 wherein the system is an electric utility with a third level comprising stations, each station comprising a plurality of objects, a fourth level comprising regions, each region in turn comprising a plurality of stations, and a top-most level comprising the network, which is constituted by various regions.

11. The arrangement as claimed in claim 10, wherein the sections that are chosen are stations so that the second panel will display a station and the first panel display a region, with the network being displayed in a third panel.

12. The arrangement as claimed in claim 1 which includes a value determining means for determining the values of a number of parameters of devices forming the system;

a value deciding means for deciding when the values of the parameters become abnormal and when they become normal; and a grouping means for grouping the parameters in a plurality of different categories.

13. The arrangement as claimed in claim 12 wherein the display means also displays the presence of abnormal parameters in each category in a graphical manner.

14. The arrangement as claimed in claim 12 wherein the categories of parameters are represented by icons.

15. The arrangement as claimed in claim 14 wherein the number of abnormal parameters in a category is represented by a number in the appropriate icon.

16. The arrangement as claimed in claim 14 wherein the various categories are represented by icons of different colours.

17. The arrangement as claimed in claim 16 wherein the number of abnormal parameters in each category is upwardly summed.

18. The arrangement as claimed in claim 1, which includes a central processing unit, so that the manner in which the parts and sections are displayed is implemented by suitable software.

19. The arrangement as claimed in claim 1, which is interactive, with the display being responsive to a pointing device so that a user can pick a symbol in the first panel to choose the desired section which will then be displayed in the second panel.

20. The arrangement as claimed in claim 1 wherein the values of the abnormal parameters are also displayed by the display means.

* * * * *